(12) United States Patent
Lund

(10) Patent No.: US 6,977,893 B1
(45) Date of Patent: Dec. 20, 2005

(54) METHOD FOR ESTABLISHING COMMUNICATION ON AN INTEGRATED SERVICES DIGITAL NETWORK

(75) Inventor: Sven O. Lund, Holte (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/313,845

(22) Filed: May 17, 1999

(51) Int. Cl.$^7$ ................................................. H04J 1/16
(52) U.S. Cl. ..................................... 370/232; 370/229
(58) Field of Search ................................ 370/216, 217, 370/218, 219, 220, 221, 222, 223, 224, 225, 370/226, 227, 228, 229, 230, 231, 232, 233, 370/234, 235, 253

(56) References Cited

U.S. PATENT DOCUMENTS

| | | | |
|---|---|---|---|
| 5,267,245 A | 11/1993 | Maruyama et al. ......... 370/109 |
| 5,276,679 A | 1/1994 | McKay et al. ................ 370/84 |
| 5,414,707 A | 5/1995 | Johnston et al. .............. 370/79 |
| 5,432,783 A | 7/1995 | Ahmed et al. ............. 370/60.1 |
| 5,432,785 A | 7/1995 | Ahmed et al. ............. 370/60.1 |
| 5,521,914 A | 5/1996 | Mavraganis et al. .......... 370/60 |
| 5,550,834 A | 8/1996 | D'Ambrogio et al. ... 370/110.1 |
| 5,691,973 A | 11/1997 | Ramstrom et al. ......... 370/58.2 |
| 5,701,295 A | 12/1997 | Bales et al. ................. 370/271 |
| 5,761,293 A | 6/1998 | Newlin et al. .............. 379/230 |
| 5,768,262 A | 6/1998 | Hallock et al. ............. 370/259 |
| 5,784,381 A * | 7/1998 | Hori ........................... 370/509 |
| 5,794,018 A | 8/1998 | Vrvilo et al. ................ 395/551 |
| 5,809,237 A | 9/1998 | Watts et al. ........... 395/200.32 |
| 5,812,535 A | 9/1998 | Hallock et al. ............. 370/264 |
| 5,812,639 A | 9/1998 | Bartholomew et al. ....... 379/89 |
| 5,818,819 A | 10/1998 | Hallock et al. ............. 370/259 |
| 5,859,979 A | 1/1999 | Tung et al. ............ 395/200.58 |
| 5,862,388 A | 1/1999 | Danneels et al. ........... 395/733 |
| 5,867,562 A | 2/1999 | Scherer ........................ 379/88 |
| 6,272,107 B1 * | 8/2001 | Rochberger et al. ........ 370/216 |
| 6,366,557 B1 * | 4/2002 | Hunter ....................... 370/217 |
| 6,473,793 B1 * | 10/2002 | Dillon et al. ............... 709/223 |
| 6,625,210 B1 * | 9/2003 | Boissel et al. .............. 375/222 |
| 6,782,264 B2 * | 8/2004 | Anderson ................ 455/456.1 |

* cited by examiner

Primary Examiner—Dang Ton
Assistant Examiner—Phuc Tran
(74) Attorney, Agent, or Firm—Schwegman, Lundberg, Woessner & Kluth, P.A.

(57) ABSTRACT

Data communication equipment and methods detect a fastest data communication transfer rate available on a communication network. The data communication equipment is capable of operating at different data communication transfer rates, and has a default communication rate which is used in establishing new network communication links. The data communication equipment modifies the default transfer rate based upon the success or failure of historical communication requests. Data communication equipment and methods dynamically adjust a delay time used during network callback operations. The data communication equipment uses the delay time to reduce the number of link connection retry attempts.

21 Claims, 5 Drawing Sheets

METHOD FOR ESTABLISHING COMMUNICATION ON AN INTEGRATED SERVICES DIGITAL NETWORK

TECHNICAL FIELD

The present invention relates generally to communication networks and in particular the present invention relates to call-back and selecting a transfer rate for communication on a network.

BACKGROUND

Telephone networks have evolved greatly over the last century. From point-to-point communication to analog voice/telephone channels to the broadband digital networks of today, the driving force has been improved services for the user. As a result, greater amounts of digital data can now be sustained by a telephone network, thus offering a user a plethora of services. For example, services such as video-on-demand, call-waiting, calling line identification, conference calling, selective call rejection, distinctive ringing and many others are now available to most users.

An integrated services digital network (ISDN) provides user-to-user digital connections at 64 Kbit/s or Kbps. The original ISDN configuration has two ISDN B channels, that each carry a bit stream of 64 Kbps, and an ISDN D channel that carries signaling and user packet data. Although an ISDN B channel typically has a transfer rate of 64 Kbps on the trunks forming the direct link between the customer premises equipment (CPE), e.g., a router, and the nearest switch, through-out the network the transfer rate may be less (usually 56 Kbps). A user can avoid a wasted call, if the CPE connects at the fastest available data rate on its network. Selection of the fastest available data rate may result in a detected transfer rate of 56 Kbps.

To select the 56 Kbps transfer rate, the CPE must be configured. A user may opt to manually configure the CPE for 56 Kbps. However, this option involves time and a certain amount of technical sophistication that all users may not have nor want. A second option is to provide a means for automatically detecting the transfer rate capability of the network.

Automatic detection methods for determining a maximum transfer rate, to date, have led to increased delay, larger network loads, and increased costs to users. Other automatic detection methods that rely on cause codes from the switches in the network are ultimately unreliable, because the cause codes for the network may be changed externally without the CPE recognizing that a change has occurred. In such cases, calls may be rejected unnecessarily.

Basic-Rate Interface is the basic ISDN configuration. This configuration consists of two B-channels (bearer-channels) that can carry voice or data at rate of 64 Kbps, and one D-channel (data-channels), which carries call-control information. Another type of ISDN configuration is called Primary-Rate Interface (PRI), which consists of 23 B-channels (30 in Europe) and one D-channel. Callback is a method used in ISDN line communications which charges the cost of a call on the network to a specific party, regardless of which party initiated the call. A party "Alpha" calling a party "Omega", can ask "Omega" to call her back. Normally, such a situation occurs automatically via point-to-point connections within an established B-channel. Inbound signaling, upon establishment of the connection, proceeds to signal to "Omega" that Alpha requests a callback, whereupon Alpha or Omega hangs up. Subsequently, Omega calls back.

A second option is usually referred to as D-channel callback and involves, in the above example, configuring Omega's equipment to recognize incoming calls from a certain party. Upon recognizing the specific incoming party's call, Omega's equipment is programmed to terminate the incoming call and call the incoming caller back within a fixed time period. A problem is encountered when the incoming call is terminated. At the far end, i.e., Alpha's end, the termination is not received immediately. There is an inherent delay of at least four seconds because of the ISDN protocol. As a result of the delay, Omega has to wait at least four seconds to call back, otherwise the line might be busy and the call will fail. If this is encountered, the router placing the callback must retry the callback operation.

For the reasons stated above, and for other reasons stated below which will become apparent to those skilled in the art upon reading and understanding the present specification, there is a need in the art for systems and methods to detect and adapt to varying network transfer rates. In addition, a system and method is needed to reduce the callback retry operations and minimize the delay associated with a callback.

SUMMARY OF THE INVENTION

In one embodiment, a method is provided for detecting a communication transfer rate over a network. The method comprises requesting a first communication link connection on the network using a default transfer rate, and requesting a second communication link connection on the network using a secondary transfer rate, if the requested first communication link connection at the default transfer rate is unsuccessful. A number of successful communication link connections established using the secondary transfer rate are monitored, and a value of the default transfer rate is changed to a value of the secondary transfer rate if the number of successful communication link connections at the secondary transfer rate exceeds a predetermined threshold value.

In another embodiment, a communication router comprises a communication interface which can be coupled to a communication network to establish a data communication link, a register circuit coupled to a processor to monitor the number of successful and/or unsuccessful data communication links. The processor initiates data communication links at either a default communication rate, or a secondary communication rate, and the processor adjusts a value of the default communication rate in response to the register circuit.

DETAILED DESCRIPTION OF THE INVENTION

Figure 1:
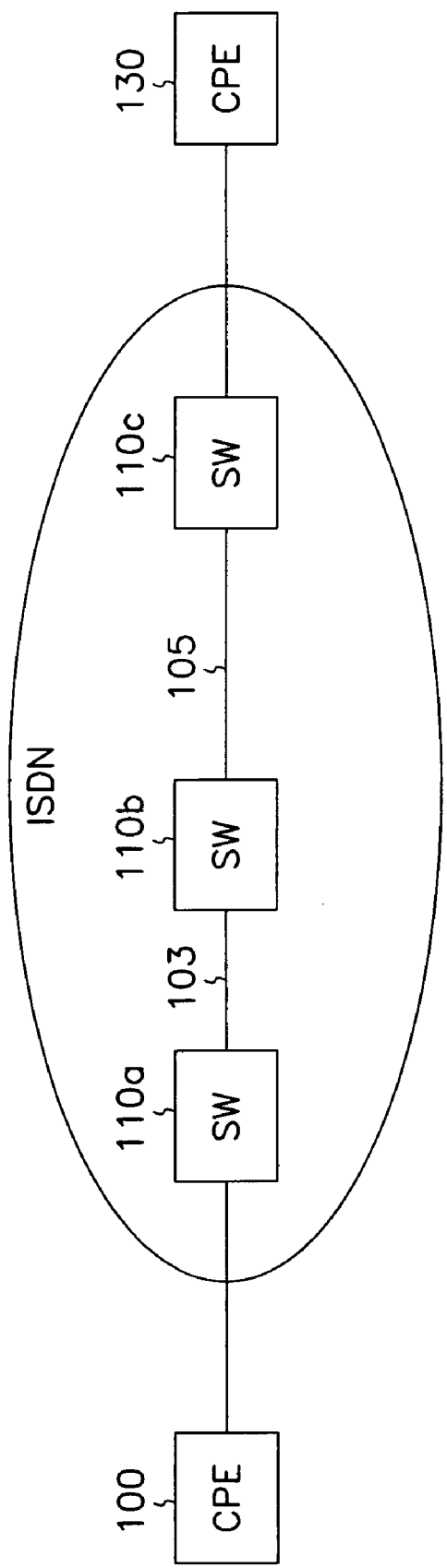
FIG. 1 is a diagram of an ISDN link containing a 56 Kbps trunk within the network.

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

As described in greater detail below, the present invention provides a device and method for reducing the time it takes to establish a communication link, or connection, to a communication network. The present invention can be particularly useful in establishing a communication link with an Integrated Services Digital Network (ISDN). In one embodiment of the present invention, a message sequence for a data device is provided and enables a data communication device to detect when two or more different transfer rates are being used over ISDN lines.

ISDN B-channels are used to provide voice and data over a communication network. The typical communication speed for data communication over an ISDN B-channel is 64 Kbps. In most networks, the 64 Kbps transfer rate is constant throughout the network, thus enabling a fast 64 Kbps connection between end-users. Yet, there are some networks, primarily in North America, that have 56 Kbps trunks on the communication path between end-users, hence restricting the available transfer rate to a slower 56 Kbps. Further, a user generally has no indication of which transfer rate will be available on the network when establishing a communication link.

Consequently, a user may opt for communication using 56 Kbps on a network which is capable of a 64 Kbps transfer rate to avoid a communication failure. However, establishing a communication speed of 56 Kbps, under such conditions, may result in less efficient communication services and increased costs, because of the unused capacity on the line. In contrast, a user may experience increased failed calls where an initial 64 Kbps transfer rate is attempted, but the network can only support 56 Kbps. It will be appreciated that failed calls increase the total connection setup time, add a network load, and in some networks, increase the cost for the user.

Previous attempts at detecting the transfer rate capability on a network have often caused delay, added load on the network and increased costs for the user. This is because for every new communication connection setup, the communication device, such as a CPE, conducts a trial and error operation which includes toggling from 64 Kbps to 56 Kbps until the correct transfer rate is determined. Another method, which depends on receiving failure "cause" codes generated by the network when a call is rejected, is also problematic. The problem with relying upon the cause codes is that intermediate networks may discard or change the cause code. Thus, the code may not always describe the true reason, or cause, for the failed call.

FIG. 1 is a diagram showing an overview of an ISDN link. The two end users CPE 100 and CPE 130 are connected over the network by a plurality of trunks 103 and 105, and switches (SW) 110a, 110b, and 110c. The network illustrated has a predominant transfer rate of 64 Kbps, but also includes portions of the trunks along the network with an available bit rate of only 56 Kbps. For example, trunk 105 of FIG. 1 has a bit rate of 56 Kbps, while trunk 103 has an available bit rate of 64 Kbps. The reduced bit rate trunk limits the entire network to the bit rate that the reduced bit rate trunk can sustain. And yet, at the local switch for each end user the transfer rate is likely 64 Kbps. Network configurations that include next bit rate communications speeds are often experienced in North America.

Customer premises equipment 100 and 130 monitors and collects statistics on successful and failed call SETUPS over the ISDN link. Based upon the collected information, the CPE determines whether the available network link provides a 56 or 64 Kbps capability. The communication equipment, therefore, can make an intelligent decision when establishing a communication connection over the network. As such, the communication equipment will use the fastest available communication speed when establishing new communication links, or calls, after an evaluation of the network is first performed.

The communication equipment is capable of communicating over the network using at least two communications speeds. In one embodiment, the communication equipment has a default communication speed of 64 Kbps and a secondary communication speed of 56 Kbps. If a communication connection is attempted at 64 Kbps, but fails, the communication equipment attempts to establish a connection using the secondary communication speed of 56 Kbps. As explained below, the present invention monitors the number of failed communication connections that are attempted at the default communication speed. When the number of failed default communication connections exceed a predetermined threshold, the communication equipment changes the default communication speed to 56 Kbps and uses 64 Kbps as a secondary communication speed.

Figure 2:
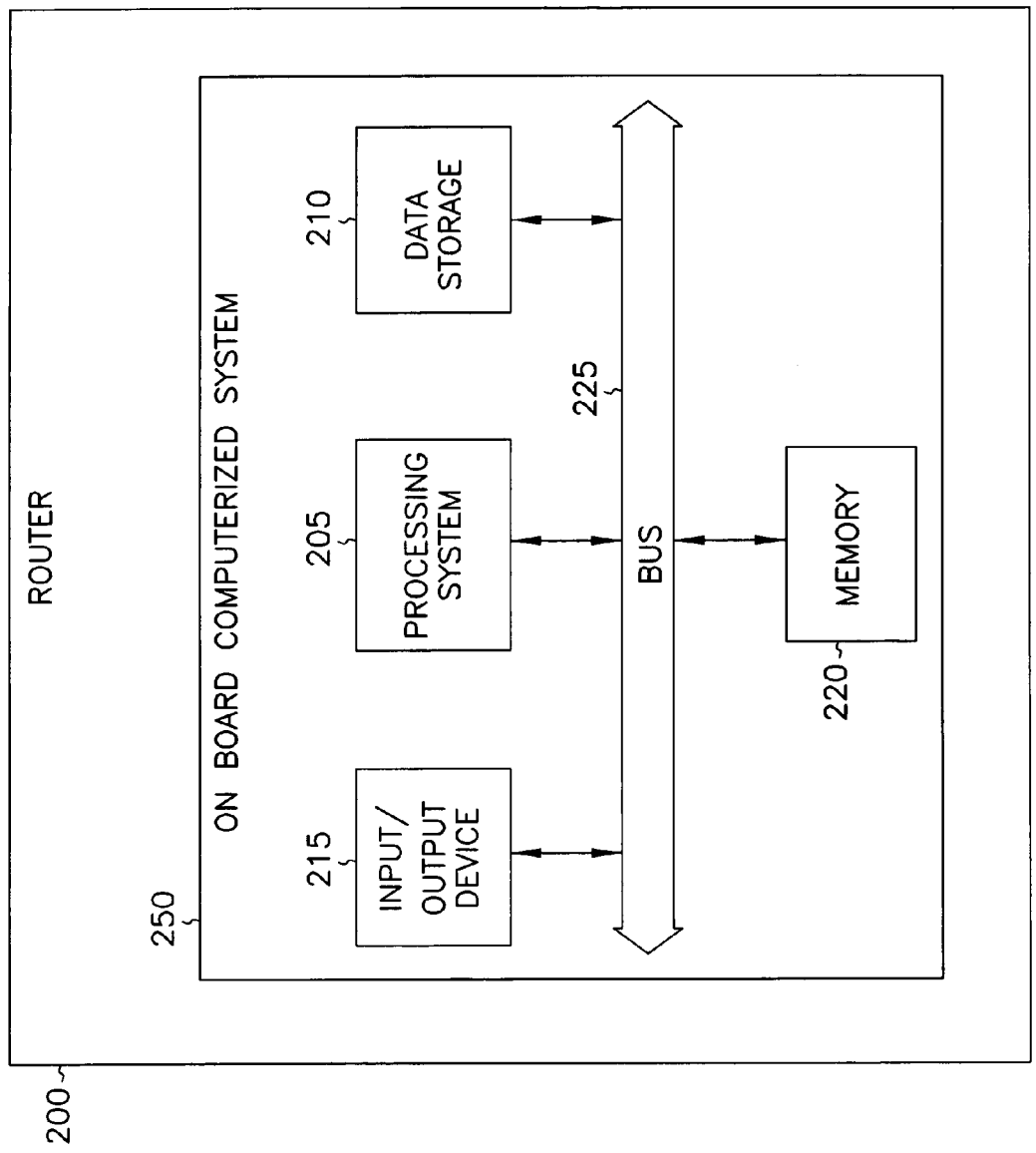
FIG. 2 is a block diagram of a data device product that uses ISDN lines.

FIG. 2 is a diagram of a communication equipment router 200 including a computerized system 250. The router may operate in either or both a local area network (LAN) or a wide area network (WAN) environment, as well as route calls. Those persons skilled in the art will recognize the various implementations for a router. To focus on the features of the present invention, therefore, the specific uses and features of a communication router are not described herein in great detail. Router 200 can be included in CPE 100 and is capable of using an algorithm that remembers recent historical communication link data and uses this information to foster quicker connectivity to a network. The computerized system 250 comprises one or more computers or processor devices. The computerized system can include a bus 225 for communicating data, a processing system 205 for processing call data and algorithms for the router, and a data storage device 210, containing registers or the like, which may be coupled with the bus for storing data and instructions. The computerized system can also contain input/output devices 215 and memory 220. Memory 220 can comprise both read only memory coupled with the bus for storing static information and instructions for the processor, as well as random access memory for dynamic information. The router illustrated in FIG. 2 can reduce call connection time by implementing a connection method described below. It will be appreciated by those skilled in the art, after reading the present description, that the inventive methods described herein can be implemented in numerous and different devices. For example, the methods can be implemented using a common computer executing an instruction set. Further, the communication equipment is not limited to a router but can be any communication of the hub or device which attempts to establish a communication connection on a communication bus or network.

Figure 3:
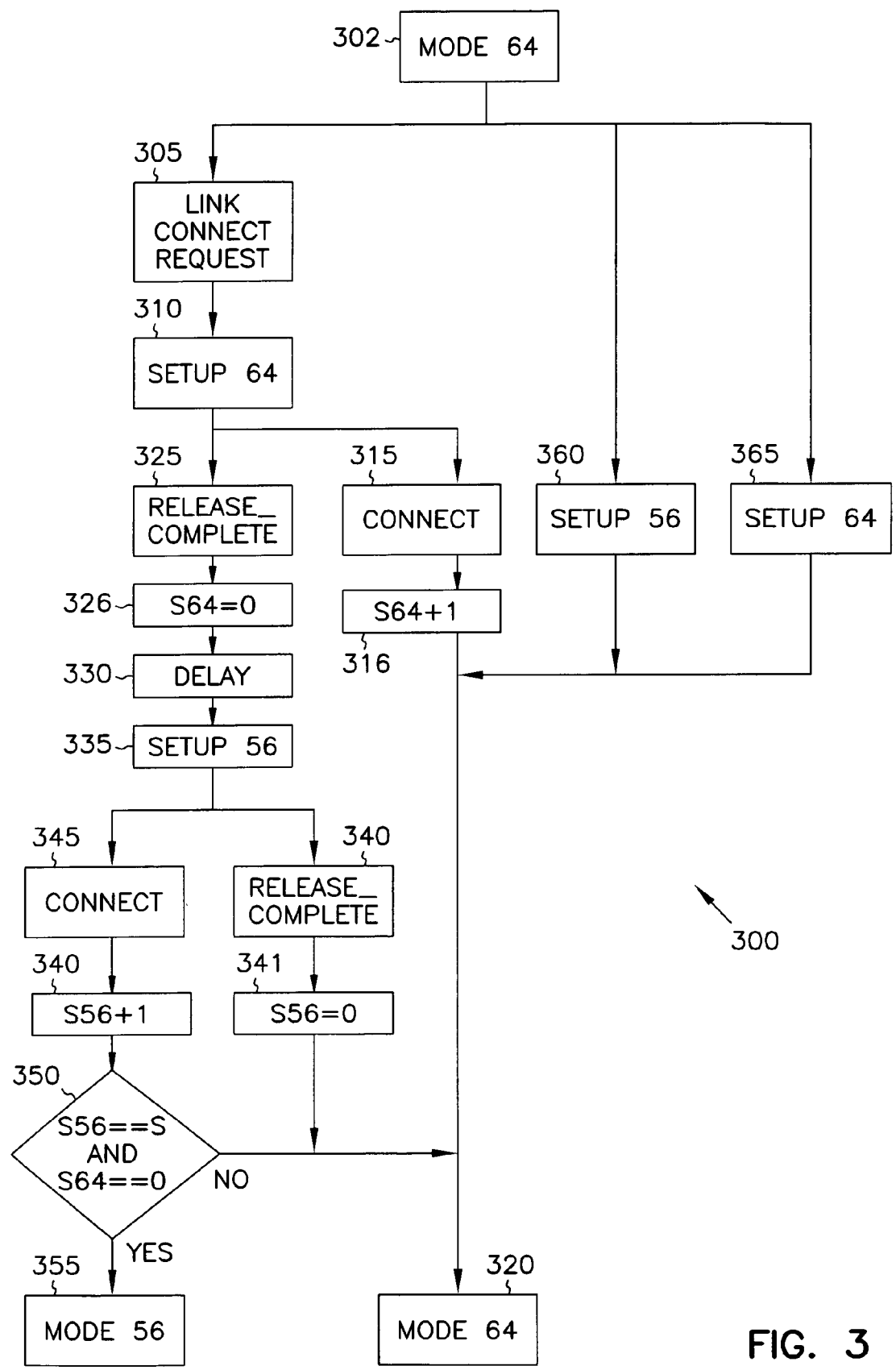
FIG. 3 illustrates a method to detect 64 Kbps on an outgoing call according to one embodiment of the present invention.

FIG. 3 illustrates a flowchart 300 of an outgoing call using a CPE wherein a transfer rate of 64 Kbps is assumed to be available on the network, i.e., Mode 64, 302. The CPE requests a communication link connection 305. Data 310 is sent to the network to SETUP the call for 64 Kbps. The network processes the call request and responds in one of two ways. Either the network sends a CONNECT signal 315, or the network sends a RELEASE_COMPLETE signal 325. If the network sends a CONNECT signal the CPE increments a register which tracks the number of successful and/or unsuccessful outgoing call SETUPs with 64 Kbps. If the network sends a RELEASE_COMPLETE signal, the CPE does not increment the tracking register for 64 Kbps; instead, the CPE resets the tracking register with zeroes for a transfer rate of 64 Kbps.

If the call request fails, the CPE provides data 335 to the network to SETUP a communication connection at for 56 Kbps. This request is typically provided after an elapsed delay period 330. Again, the network can return either a CONNECT or a RELEASE_COMPLETE signal. The CPE increments a register which tracks the number of successful and/or unsuccessful communication attempts at 56 Kbps when the network returns a CONNECT signal. If the 56 Kbps tracking register has a value and the 64 Kbps tracking register does not, or the value is null 350, then the system determines that it has detected a 56 Kbps transfer rate and operates at Mode 56 355. Otherwise, the system determines that it has detected a 64 Kbps network and continues to operate at Mode 64 320. Likewise, where the 64 Kbps tracking register is incremented the system operates at Mode 64 320. Mode 64 may be entered directly where alternative SETUP signals 360, 365 are sent from the network.

After trying to connect at the faster default transfer rate and failing to do so for a predetermined number of attempts, the system determines that the actual available transfer rate is slower than the default transfer rate. A threshold value (SuccessLimit 56) for the number of acceptable failed calls is determined, before requiring the network to try and connect at the lower transfer rate. To limit the learning time, a low threshold value can be used. For greater reliability, a higher value can be used. These values may vary, in different embodiments the threshold may vary between two and ten attempted connections at the higher default data rate.

Figure 4:
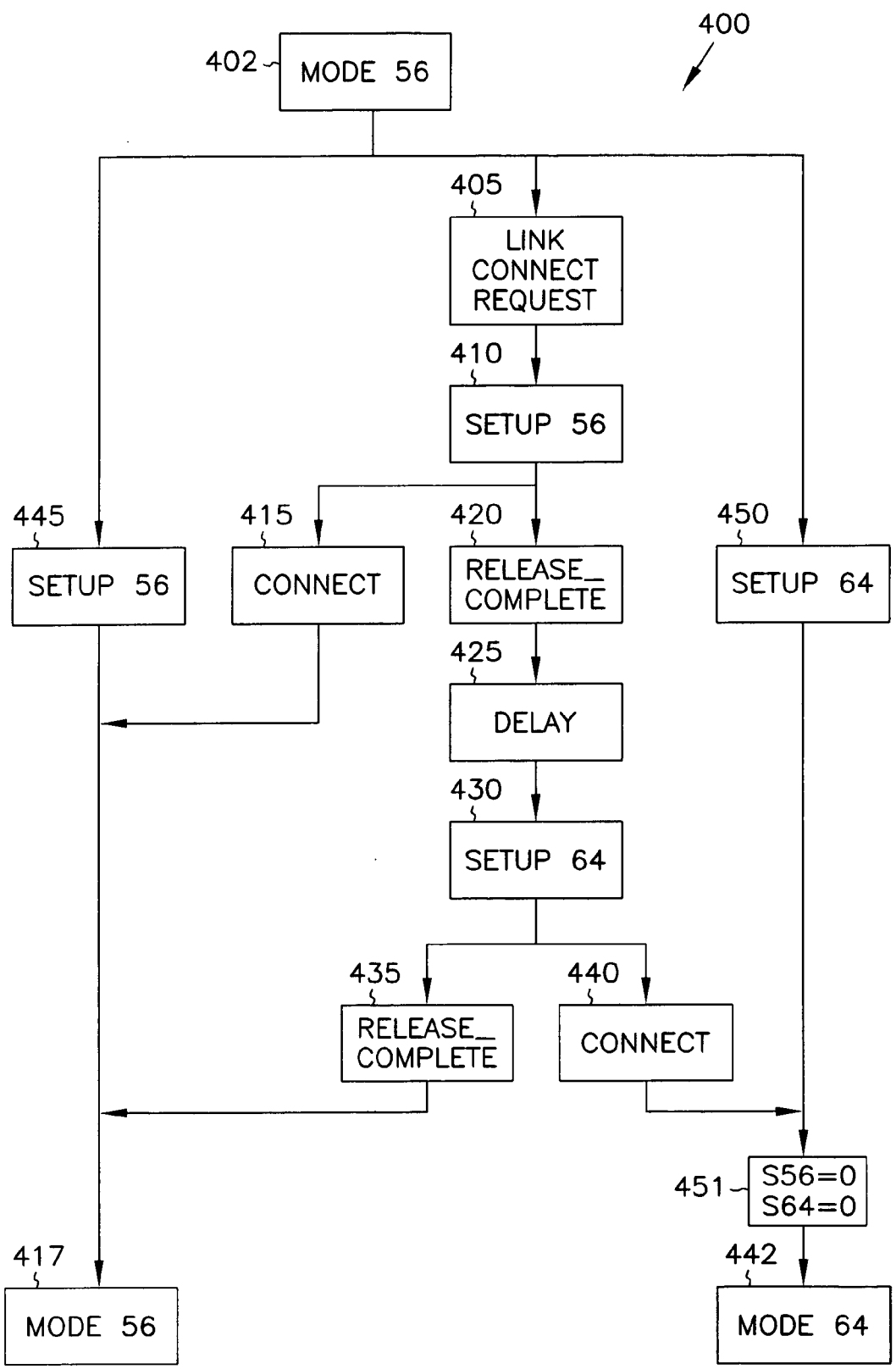
FIG. 4 is a method to detect 56 Kbps on an outgoing call according to one embodiment of the present invention.

FIG. 4 illustrates a flowchart where the communication equipment uses a default transfer rate of 56 Kbps 402. Thus, the network starts in Mode 56 and requests a link connection 405. Call request data 410 is sent to the network to indicate a call is SETUP for 56 Kbps. As explained above the network may respond in one of two ways, either issuing a CONNECT signal 415, or a RELEASE_COMPLETE signal 420. If a CONNECT signal 415 is issued, then Mode 56 is detected and a transfer rate of 56 Kbps is used. If a RELEASE_COMPLETE signal 420 is issued, a delay 425 ensues, resulting in a second SETUP signal 430. The second SETUP signal 430 requests a communication using a 64 Kbps transfer rate.

Once again, the network either may issue a RELEASE_COMPLETE signal 435 therein indicating Mode 56 417, or the network may issue a CONNECT signal 440. Where a CONNECT signal is issued subsequent to a SETUP at 64 Kbps, indicating a successful outgoing SETUP 64, an immediate transition to Mode 64 happens. That is, the communication equipment determines that it has detected a transfer rate of 64 Kbps. Likewise, when the network issues a SETUP for 64 Kbps 450, the network is at Mode 64. Alternatively, when the network issues a SETUP for 56 Kbps 445, the network is at Mode 56, i.e., a detected transfer rate of 56 Kbps.

The present invention, therefore, monitors the number of unsuccessful connection attempts using the default transfer rate, and/or the number of successful connection attempts using the secondary transfer rate. Using this data, the maximum data communications available on the network can be determined and used as the primary communication speed for subsequent communication requests.

The communication system and method described herein is applicable to different data rates and is not limited to 64 and 56 Kbps. Further, the present invention encompasses any equipment attempting to establish a communication link over a dated network which can be operated using two or more data communications speeds.

CALLBACK OPERATION

As stated above, link connections are often rejected. The rejection is not always a result of selecting an improper data transfer rate. A rejection can occur when an established ISDN link connection has been terminated and an attempt is made to callback a user during a predetermined delay period associated with ISDN protocol. One problem encountered following a termination, is that the switch serving the responding data device often delays notifying the requesting data device that a termination has occurred for a specified period of time while it awaits responses from all the devices on the same basic rate ISDN line. Often, this time can be four seconds or greater. During this time period the responding data device remains idle, because to attempt a callback will result in a rejected/failed call. A user may identify the responding data device by the calling line identification which is the ISDN number of the responding data device. In some countries, a user is charged for every call, including failed calls. Moreover, some countries limit how many retries a user may attempt during a narrow time frame.

One embodiment of the present invention provides a delay during the callback operation to reduce the chance that the requesting router is busy. This time delay is dynamic and adjusts to the configuration of the network in which it is operating. Following is a list of terms used to describe the present callback operation. "Callback delay" (CBD) is the present callback delay used by the callback equipment. "Maxcallback delay" (maxCBD) is the maximum allowed callback delay which can be used by the callback equipment. "FastAdaption Limit" (FAL) is a delay time in which the callback delay adaption changes from a fast adaption to a slow adaption. "Callback fails" (CBF) is a current number of consecutive callback failures. "MaxCallback Fails" (Max-CBF) is a limit of consecutive callback failures which can be experienced before the callback delay is incremented during slow adaption.

The present invention provides a callback operation which attempts to adapt to the actual delay of the network in order to reduce the set-up time for a callback. That is, the present invention learns from past switch behaivor and makes future connection decisions on this basis. The purpose of the present invention is to let the first outgoing callback succeed, i.e., no rejection by the switch without retrying a callback every second. Callback is used to place the charge/cost on a specific user, regardless which end user initiated the connection.

For example, an internet service provider (ISP) wants to establish a connection for the purpose of delivering e-mails to a user. And yet, the user will pick up the cost of the connected call. By using a callback request the user is charged for all communication with the ISP, including receiving and sending e-mails. When a data device requests a call which is rejected, there is an inherent delay before a callback can be attempted. After the delay passes and in response to the callback request, the responding data device attempts a first callback. The delay, CBD, is dynamic and adapts automatically to the lowest possible value for the ISDN connection involved. Furthermore, if the responding data device is on a point-to-point line, then the first callback attempt succeeds and the CBD remains at zero. It is noted, that the CBD is used during the first callback attempt in response to the requesting data device. If the first callback attempt fails, then a normal retry algorithm of the CPE takes over to complete the callback operation.

The callback delay adapts automatically in the range of 0 seconds to the maximum callback delay (maxCBD) in seconds. The callback delay is incremented unless a successful callback takes place. In other words, the callback delay is incremented when the callback operation is unsuccessful. Until the callback delay reaches the fast adaption limit, FAL, or above, one second of delay is added to the callback delay, CBD. Whereupon, after the number of consecutive callback attempt failures equals or exceeds the maximum callback failure value, MaxCBF, the CBD is incremented. In one embodiment, the fast adaption limit may be set to a default time out used in the ISDN switch plus two seconds to compensate for network delay. The default time out used in the ISDN switch is typically 4 seconds, but can be greater.

If the responding data device which initiates the callback operation is provided on a point-to-point line, the first callback operation will probably be successful and a callback delay will remain at zero seconds. If the callback responder is on a multi-point line, then the ISDN typical time out is used (approximately 4 seconds) as the callback delay. Thus, CPE stabilizes to approximately 4 to 6 seconds depending on the network loading in the distance between the two CPE's used. Because callback may be rejected by events other than a busy line on the callback, a slow adaption provides a protection against false delay increments caused by such events. If the ISDN typical time out is greater than the provided maximum callback delay, then the callback delay will stabilize to the provided maximum callback delay. In addition, if the user is reconfigured or reset, the callback delay is reset to 0 such that the adaptive delay process starts again.

Figure 5:
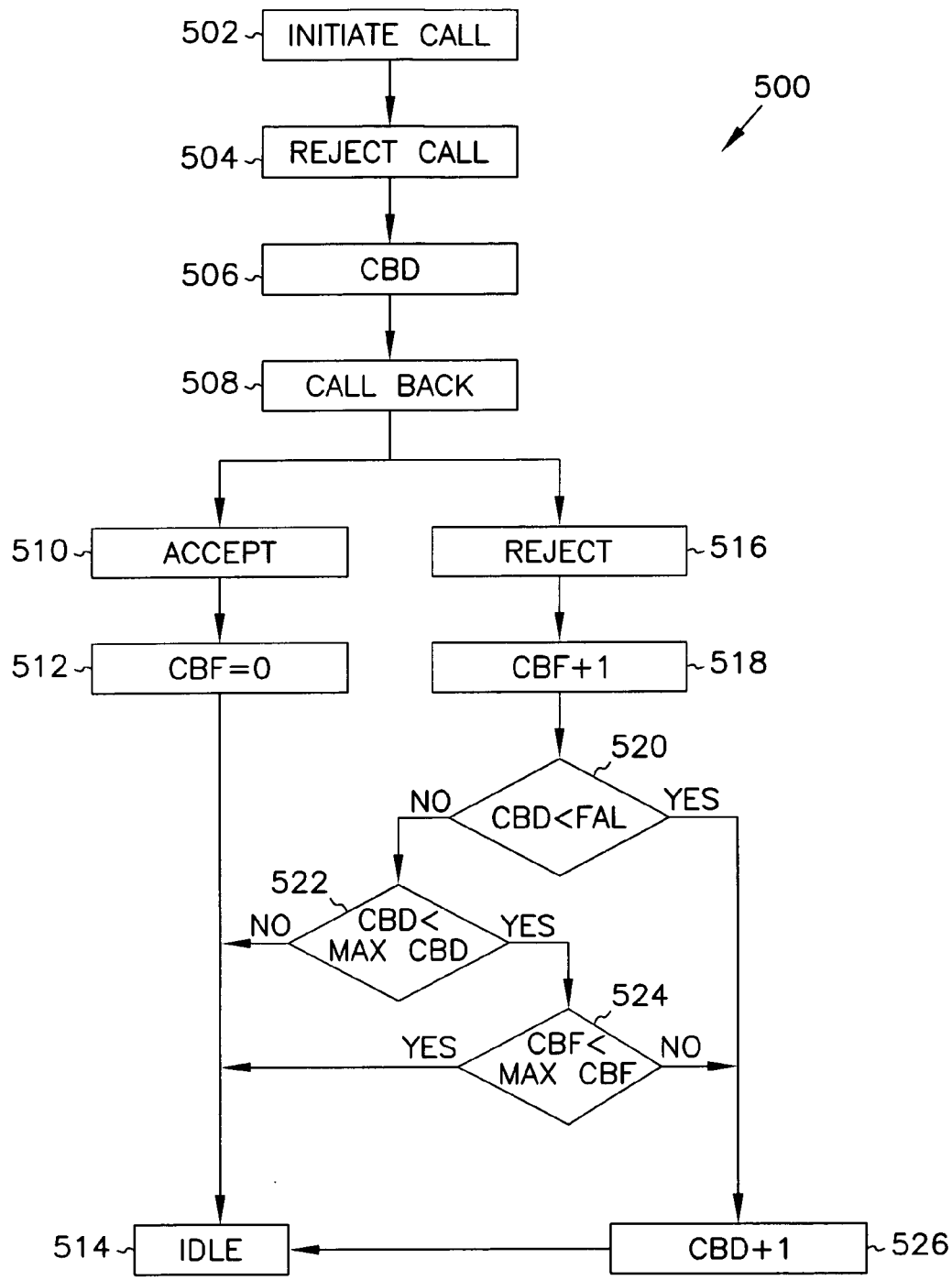
FIG. 5 illustrates a flowchart of one embodiment of the present invention used for adaptive callback time delay operations.

FIG. 5 illustrates a flowchart of one embodiment of the present invention used for adaptive callback time delay operation. The method 500 starts when an incoming call is initiated at block 502. The call is rejected at block 504 and the callback delay, CBD, is implemented at block 506. The length of the callback delay is determined and adjusted automatically, as explained below. The responding network equipment initiates the callback operation at block 508 following the callback delay. If the requesting equipment accepts the callback, the callback failure counter, CBF, is not incremented, block 512. The callback equipment is placed in an idle state, 514.

If the callback operation results in a rejection 516, or failed callback, then the callback failure counter is incremented by one, block 518. A decision is then made to determine if the callback delay is less than the fast adaption limit, FAL, at block 520. If the callback delay is less than the fast adaption limit, the callback delay is incremented immediately by one at block 526. No callback occurs at this point, instead a historical delay is remembered for the next try at callback. If the callback delay is greater than the fast adaption limit, a decision is made to determine if the callback delay is less than the maximum callback delay, the highest allowed callback delay imposed on the responder by the ISDN protocol, block 522. If the present callback delay is not less than the maximum callback delay, the callback equipment is placed in an idle state. If the callback delay is less than the maximum callback delay allowed, another decision is made to determine if the consecutive callback failures, CBF, is less than the maximum callback failures allowed, normally a value of 2–3 failed calls, block 524. If the callback failures are less than the maximum callback failures, the system is placed in the idle state. If, however, the consecutive callback failures are greater than the maximum callback failures the callback delay, CBD, is incremented by one at block 526.

The above described method is one embodiment of an adaptive delay callback system which provides a callback delay which can be implemented prior to placing a callback on a multi-point network. The system monitors the number of consecutive callback failures and increments the callback delay until successful callback operations are experienced. The communication device, or router, which initiates a callback operation includes a circuit for monitoring the number of consecutive callback failures, a circuit for maintaining a callback delay value, and circuits for maintaining the maximum callback delay and maximum callback failure values. This circuitry can be data registers, or memory, which store the selected and variable values. In addition, the callback equipment can include a processor which can execute software instructions to instruct the processor to perform the callback operation and callback delay calculation. Further, the callback equipment can include a variable delay circuit which is controlled in response to the value of the dynamically adjusted callback delay.

In one example, FAL is set to 2, MaxCBD is set to 6, MaxCBF is set to 4, and the MaxCBF is set to 2. Using this configuration, a CPE requests a call which is rejected. The callback attempt results in a failure and the callback failure counter is incremented by one. Because the original callback delay is equal to 0, CBD<FAL and the callback equipment increments the callback delay by 1 second, CBD+1.

On a subsequent failed call attempt, the callback equipment waits one second to provide a callback request. If this callback attempt is unsuccessful, the callback counter is incremented by one, CBF=2. Because the callback delay is equal to 1, CBD<FAL and the callback equipment increments the callback delay by 1 second, CBD+1=2.

On a subsequent failed call attempt, the callback equipment waits two seconds to provide a callback request. If this callback attempt is unsuccessful, the callback counter is incremented by one, CBF=3. Because the callback delay is equal to the fast adaption limit, CBD=FAL, a decision is made regarding MaxCBD. At this iteration, CBD is less than MaxCBD and CBF is less than MaxCBF. As such, the equipment is place in an idle state and the CBD is not incremented.

In response to a subsequent failed call request, the callback equipment waits two seconds to initiate a callback. If a successful call is placed in response to the callback operation, CBF is reset to 0 in the callback delay remains equal to 2 seconds.

CONCLUSION

A method and communication equipment has been described for detecting transfer rates over a communication network that can be operated using two different communications speeds. The equipment has a default communication speed, and a secondary communication speed. The communication equipment, such as a router, monitors a number of unsuccessful communication attempts using the default communication speed. If the number of unsuccessful communication attempts exceeds a predetermined threshold value, the communication equipment modifies the default communication speed to the secondary communication speed to ensure connection of a call. The method minimizes subsequent failing calls and does not rely on cause codes. As such, the apparatus has processing ability to track rejected calls over a network and adapt to the network thereby reducing the number of future rejected calls. Furthermore, network load, call setup time, and the costs associated with them are minimized.

In addition, a callback operation has been described which implements a callback delay to reduce the possibility that an initiating CPE is still busy. The callback delay is dynamic and adapts to network configurations and characteristics. The callback delay is incremented in response to unsuccessful callback operations. A slow adaption routine is included so that the callback delay is not incremented when callback operations fail due to factors other than a busy initiating CPE.

The described embodiments are independent of the network or switches on a particular network, hence the embodiment can interface with any third party equipment. Finally, the embodiments contribute to a higher degree of cost-efficiency and plug-and-play functionality. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that only the claims and the equivalents limit this invention.

What is claimed:

1. A method for detecting a communication transfer rate over a network, the method comprising:
   requesting a first communication link connection on the network using a default transfer rate;
   requesting a second communication link connection on the network using a secondary transfer rate, if the requested first communication link connection at the default transfer rate is unsuccessful;
   monitoring a number of successful communication link connections established using the secondary transfer rate; and
   changing a value of the default transfer rate to a value of the secondary transfer rate if the number of successful communication link connections at the secondary transfer rate exceeds a predetermined threshold value.

2. The method according to claim 1, wherein the network comprises an integrated services digital network (ISDN) for communicating digital information.

3. The method according to claim 1, wherein the default transfer rate is approximately 64 Kbps.

4. The method according to claim 1, further comprising receiving a failed connection signal in response to the request for the first communication link connection indicating that the first communication link connection at the default transfer rate is unsuccessful.

5. The method according to claim 1, wherein the secondary transfer rate is approximately 56 Kbps.

6. A method of operating communication equipment coupled to a data communication network, the method comprising:
   establishing a plurality of communication links on the data communication network, each one of the communication links comprises:
      requesting a first data communication link using a default communication transfer rate of 64 Kbps,
      receiving an indicating from the data communication network that the first data communication link was unsuccessful; and
      requesting a second data communication link using a secondary communication transfer rate of 56 Kbps;
   monitoring a number of successful second data communication link requests using the secondary communication transfer rate;
   changing the default communication transfer rate to 56 Kbps if the number of successful second data communication link requests exceeds a predetermined threshold value; and
   establishing a plurality of subsequent communication links on the data communication network comprising requesting a first data communication link using a default communication transfer rate of 56 Kbps.

7. A method of operating communication equipment coupled to a data communication network, the method comprising:
   establishing a plurality of communication links on the data communication network, each one of the communication links comprises:
      requesting a first data communication link using a default communication transfer rate of 64 Kbps,
      receiving an indication from the data communication network that the first data communication link was unsuccessful, and
      requesting a second data communication link using a secondary communication transfer rate of 56 Kbps,
   monitoring a number of unsuccessful first data communication link requests using the default communication transfer rate;
   changing the default communication transfer rate to 56 Kbps if the number of unsuccessful first data communication link requests exceeds a predetermined threshold value; and
   establishing a plurality of subsequent communication links on the data communication network comprising requesting a first data communication link using a default communication transfer rate of 56 Kbps.

8. A communication router comprising:
   a communication interface which can be coupled to a communication network to establish a data communication link;
   a register circuit coupled to a processor to monitor the number of successful and/or unsuccessful data communication links; and
   the processor initiates data communication links at either a default communication rate, or a secondary communication rate, and the processor adjusts a value of the default communication rate in response to the register circuit.

9. The communication router of claim 8 wherein the default communication rate and the secondary communication rate are selected from the group comprising 64 Kbps and 56 Kbps.

10. The communication router of claim 8 wherein the communication network is an integrated services digital network (ISDN).

11. The communication router of claim 8 wherein the processor adjusts the value of the default communication rate when a value of the register circuit exceeds a predetermined threshold value.

12. The communication router of claim 8 wherein the register circuit monitors a number of unsuccessful data communication links attempted using the default communication rate.

13. The communication router of claim 8 wherein the register circuit monitors a number of successful data communication links attempted using the secondary communication rate.

14. A computer readable medium having a computer program stored thereon for instructing a computer to perform a method comprising:
  requesting a first communication link connection on a network using a default transfer rate;
  requesting a second communication link connection on the network using a secondary transfer rate, if the requested first communication link connection at the default transfer rate is unsuccessful;
  monitoring a number of successful communication link connections established using the secondary transfer rate; and
  changing a value of the default transfer rate to a value of the secondary transfer rate if the number of successful communication link connections at the secondary transfer rate exceeds a predetermined threshold value.

15. A computer readable medium having a computer program stored thereon for instructing a computer to perform a method comprising:
  establishing a plurality of communication links on the data communication network, each one of the communication links comprises:
    requesting a first data communication link using a default communication transfer rate of 64 Kbps,
    receiving an indication from the data communication network that the first data communication link was unsuccessful, and
    requesting a second data communication link using a secondary communication transfer rate of 56 Kbps,
  monitoring a number of unsuccessful first data communication link requests using the default communication transfer rate;
  changing the default communication transfer rate to 56 Kbps if the number of unsuccessful first data communication link requests exceeds a predetermined threshold value; and
  establishing a plurality of subsequent communication links on the data communication network comprising requesting a first data communication link using a default communication transfer rate of 56 Kbps.

16. A data communication system comprising:
  a data communication network capable of operating at a maximum data communication rate; and
  a data communication transmitter coupled to the data communication network comprising:
    a communication interface which is coupled to the data communication network to establish a data communication link;
    a register circuit coupled to a processor to monitor the number of successful and unsuccessful data communication links; and
    the processor initiates data communication links at either a default communication rate, or a secondary communication rate, and the processor adjusts a value of the default communication rate in response to the register circuit.

17. The data communication system of claim 16 wherein the data communication network is an integrated services digital network (ISDN).

18. The data communication system of claim 16 wherein the data communication transmitter can communicate data at either 64 Kbps or 56 Kbps.

19. The data communication system of claim 16 wherein the maximum data communication rate of the data communication network is at least 56 Kbps.

20. The data communication system of claim 16 wherein the data communication transmitter has a default communication rate of 64 Kbps when a value of the register circuit is less than a predetermined threshold value.

21. The data communication system of claim 16 wherein the data communication transmitter adjusts the value of the default communication rate from 64 Kbps to 56 Kbps in response to the register circuit.

* * * * *